US006978682B2

(12) United States Patent
Foster et al.

(10) Patent No.: US 6,978,682 B2
(45) Date of Patent: Dec. 27, 2005

(54) FORCE-ADJUSTABLE HAND-HELD COFFEE/ESPRESSO TAMPING DEVICE

(76) Inventors: Randal J. Foster, 513 Tullis St. NE., Olympia, WA (US) 98506; Zeta A. Kelly, 513 Tullis St. NE., Olympia, WA (US) 98506

(*) Notice: Subject to any disclaimer, the term of this patent is extended or adjusted under 35 U.S.C. 154(b) by 112 days.

(21) Appl. No.: 10/413,775

(22) Filed: Apr. 15, 2003

(65) Prior Publication Data

US 2004/0206243 A1 Oct. 21, 2004

(51) Int. Cl.$^{7}$ .......... G01N 3/08
(52) U.S. Cl. .......... 73/818
(58) Field of Search .......... 73/760, 818; 99/275, 99/280, 297, 279, 295, 285, 286; 426/512, 426/433, 435; 222/305; 227/130; 172/381, 172/22, 1; 604/220; 404/133.1; 347/19

(56) References Cited

U.S. PATENT DOCUMENTS 3,657,993 A * 4/1972 Close .......... 99/297
4,386,109 A * 5/1983 Bowen et al. .......... 426/241
4,627,563 A * 12/1986 Meyer .......... 227/130
4,644,856 A * 2/1987 Borgmann .......... 99/295
4,804,550 A * 2/1989 Bardsley et al. .......... 426/397
4,957,753 A * 9/1990 Bardsley et al. .......... 426/111
5,174,194 A 12/1992 Piana
5,479,848 A 1/1996 Versini
5,490,447 A 2/1996 Giuliano
5,526,733 A * 6/1996 Klawuhn et al. .......... 99/287
5,618,570 A * 4/1997 Banks et al. .......... 426/435
5,636,563 A * 6/1997 Oppermann et al. .......... 99/285
5,658,608 A 8/1997 Klefbeck
5,911,810 A * 6/1999 Kawabata .......... 99/302 P
6,090,077 A * 7/2000 Shaw .......... 604/195
6,095,032 A 8/2000 Barnett et al.
6,257,346 B1 * 7/2001 Schofield et al. .......... 172/381
6,616,640 B2 * 9/2003 Chen .......... 604/220
6,662,879 B1 * 12/2003 Costa .......... 172/22

* cited by examiner

*Primary Examiner*—Max Noori
*Assistant Examiner*—Octavia Davis

(57) ABSTRACT

A force-adjustable hand-held coffee/espresso tamping device is used to uniformly pack grounds and replicate espresso quantity and quality from one cup to the next. The user is provided with an adjustable, calibrated method for setting the tamping force desired, and the device emits a signal when this predetermined force is achieved. The hand-held nature of the device allows the espresso machine operator great flexibility in fine-tuning the overall operation.

6 Claims, 6 Drawing Sheets

20
60
99
80
90
V
IV
III

*FIG. 8*

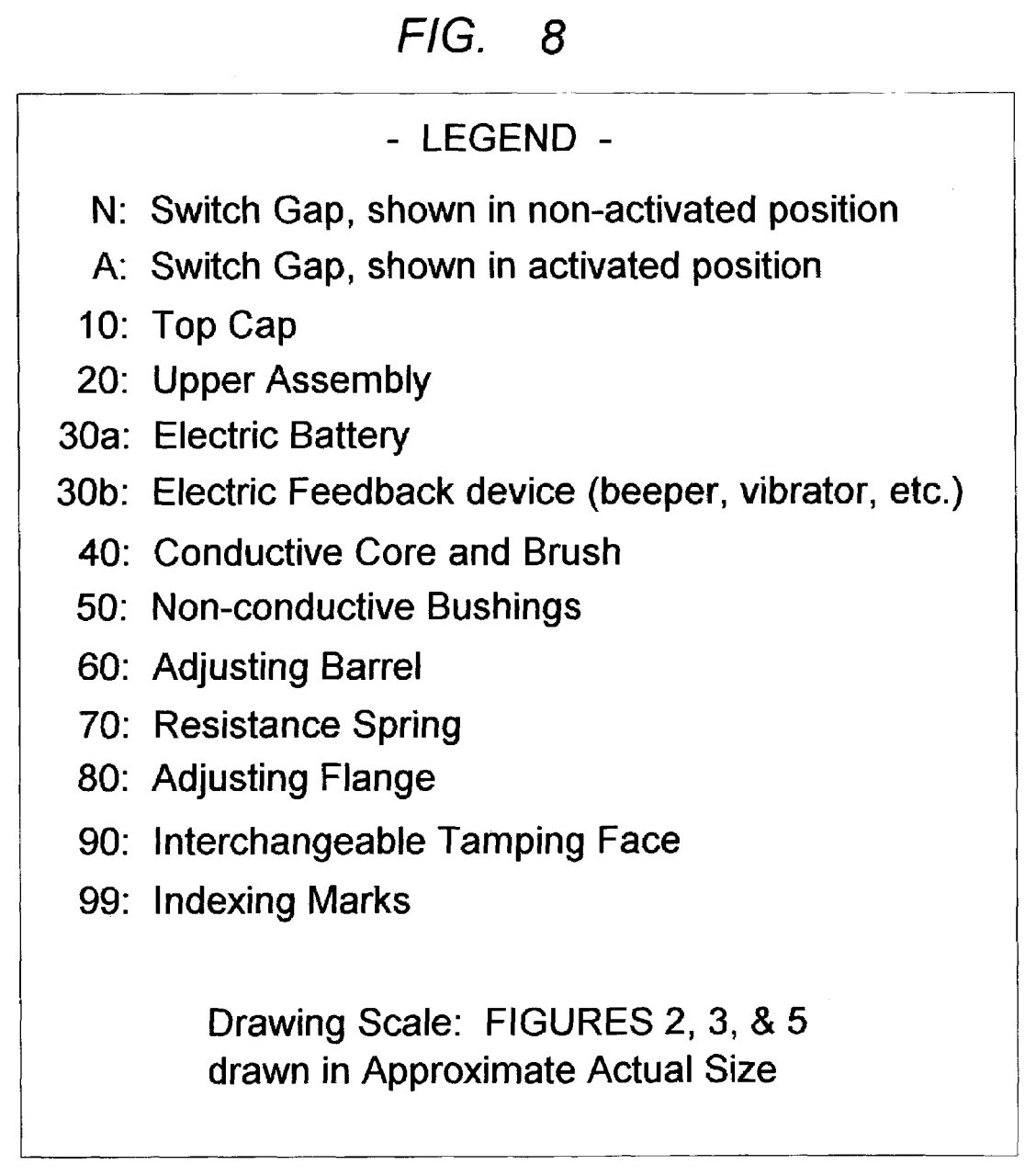

- LEGEND -

N: Switch Gap, shown in non-activated position
A: Switch Gap, shown in activated position
10: Top Cap
20: Upper Assembly
30a: Electric Battery
30b: Electric Feedback device (beeper, vibrator, etc.)
40: Conductive Core and Brush
50: Non-conductive Bushings
60: Adjusting Barrel
70: Resistance Spring
80: Adjusting Flange
90: Interchangeable Tamping Face
99: Indexing Marks Drawing Scale: FIGURES 2, 3, & 5
drawn in Approximate Actual Size

FORCE-ADJUSTABLE HAND-HELD COFFEE/ESPRESSO TAMPING DEVICE

TECHNICAL FIELD

The present invention is in the field of coffee/espresso beverage preparation and specifically is a hand-held, force-adjustable tamper, used to tamp, or compress coffee/espresso grounds into a filter basket of a group head assembly of an espresso machine for use during the espresso brewing or extraction process.

A widely accepted industry standard for liquid espresso volume and extraction duration when making espresso is 2 to 2.5 ounces of espresso extracted during an approximate 18 to 30 seconds of time. There are several critical steps in the process to achieve this standard.

One critical step is tamping or pressing the ground espresso into the portable filter head of the group assembly prior to delivery of the group assembly to the espresso machine. Traditionally, the process has relied on the espresso machine operator's judgment to determine tamping force, with no verifiable reference. This often creates a non-uniform and a non-specific density of tamped espresso grounds in the filter basket, making it difficult to achieve the standard mentioned above. Additionally, it remains difficult to replicate the quality of the espresso extracted, from one drink to the next.

To overcome this problem, prior art exists in the form of automatic espresso machines wherein the machines automatically perform all the necessary steps involved in espresso making with little or no involvement from an operator. Problems exist in that this is a comprehensive system with little or no tamping force control, since this is a factory preset. One must also purchase the entire extraction system without the ability to isolate just the tamping feature.

An additional disadvantage of traditional coffee tampers is the tamping face and body are typically fixed as one unit and the tamping face is of a fixed nominal size to fit a single compatible filter basket. Filter baskets come in a variety of sizes and thus, require acquisition of an entire tamper when trying to match tamper face size to a filter basket size. Additionally, there are different tamper face shapes currently available; again, to use a different shape, a consumer would need to acquire an entire tamper when tamper face replacement would have been optimal.

SUMMARY OF THE INVENTION

It is an object of the present invention to solve the problems of traditional espresso tampers while achieving the desired result of uniformly packed grounds and replicable espresso quantity and quality from one cup to the next. The present invention provides the desired result as it provides the user with an adjustable, calibrated method for setting the tamping force desired and it emits a physical signal when the desired force is achieved. This results in uniformly tamped espresso grounds rendering consistent, quality espresso drinks that can be replicated over and over again once the tamper has been set to the ideal tamping force.

Counter to the automatic espresso machines wherein the tamping step is integral to the unit, the hand-held nature of the present invention allows the espresso machine operator greater flexibility in fine-tuning the overall operation. As one step in several, the user can isolate the tamping step and make adjustments as necessary based on their immediate preferences.

Additionally, the present invention has interchangeable tamping faces that allow consumers to purchase only a new tamping face rather than replacing the entire unit when in need of a different size tamper. The tamper faces can also be made available in a variety of shapes as there are different accepted standard shapes in the industry and they can be available in different materials and weights to accommodate various consumer preferences.

BEST MODE FOR CARRYING OUT THE INVENTION

Figure 1:
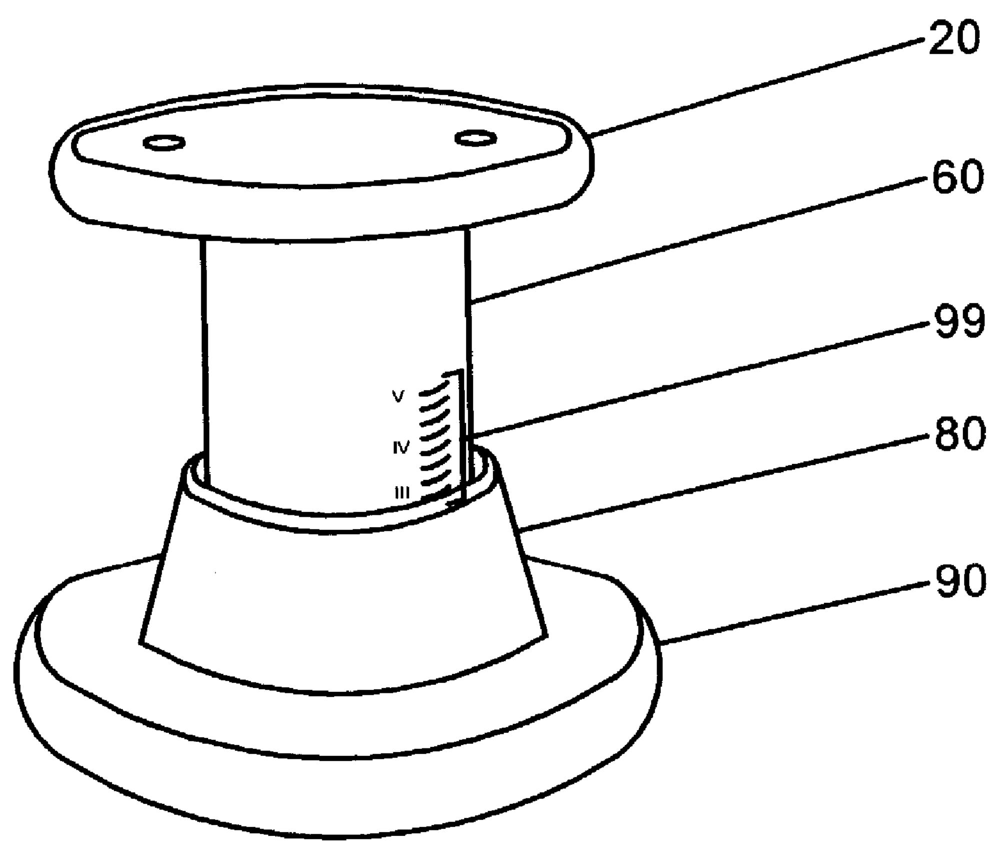
FIG. 1 is a perspective view of the present invention.

FIG. 1 shows a perspective view of a force-adjustable espresso tamper. A tamper face 90 is the component that actually contacts the espresso grounds when they are being tamped or compressed in a filter basket of a group head assembly of an espresso machine. An adjusting flange 80 is partially screwed onto threads that are located on the lower end of an adjusting barrel 60. How far the adjusting flange 80 has been screwed onto the adjusting barrel 60 is indicated by a set of indexing marks 99. These marks are milled into the exterior surface of the adjusting barrel 60. One can compare the location of the top of the adjusting flange 80 with the adjacent indexing mark 99 for information about how far the adjusting flange 80 has been screwed onto the adjusting barrel 60. How far the adjusting flange 80 has been screwed onto the adjusting barrel 60 determines the amount of force that is required to activate an electrical feedback circuit. When the feedback circuit is activated, the operator of the tamper becomes aware that the pre-set amount of force has been applied to the espresso grounds that are being tamped, via the force-adjustable espresso tamper. The operation of the tamper is specifically discussed in the paragraphs regarding FIG. 4.

Figure 2:
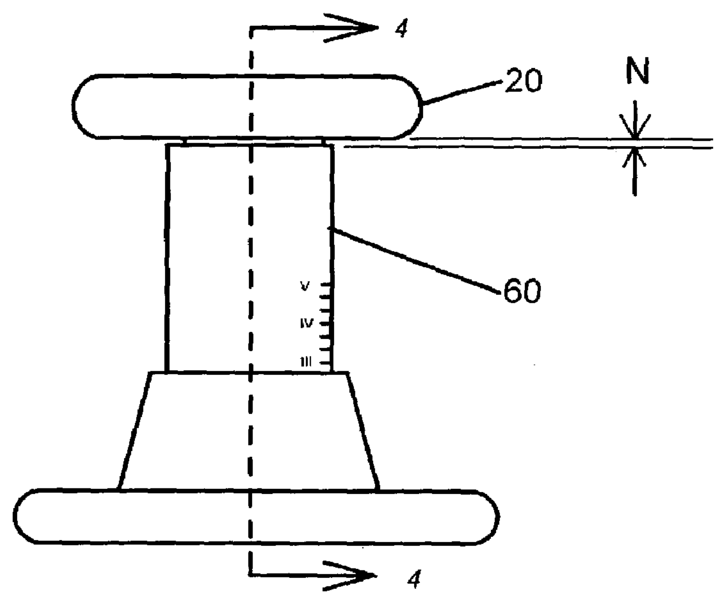
FIG. 2 is a front view, non-activated position.

FIG. 2 is a front view of the tamper. There is a slight gap N between a bottom surface of an exposed portion of an upper assembly 20 and a top surface of the adjusting barrel 60. This gap exists when the tamper is in the non-activated position. No feedback is being generated by the electrical feedback circuit of the tamper. The electrical circuit is in an "off" position when the gap N shown in FIG. 2 exists.

Figure 3:
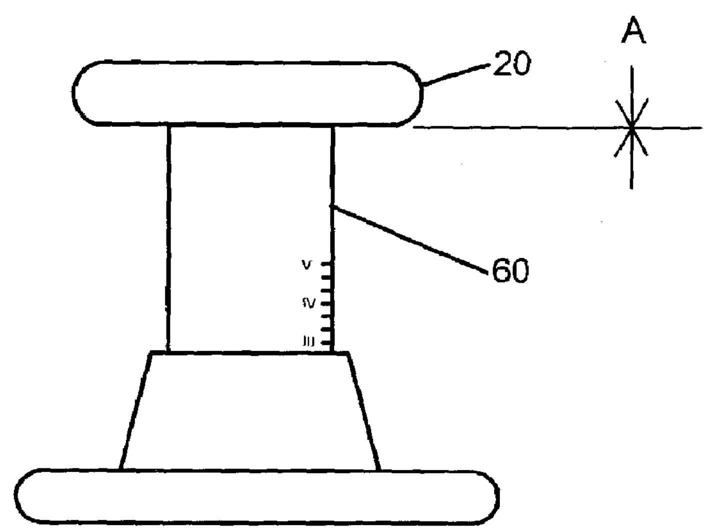
FIG. 3 is a front view, activated position.

FIG. 3 is a front view of the tamper showing no gap between the bottom of the exposed part of the upper assembly 20 and the top surface of the adjusting barrel 60. This non-gap A indicates that electrical contact has been made between the upper assembly 20 and the adjusting barrel 60. Such contact switches the electrical feedback circuit "on," notifying the operator of the tamper that the pre-determined amount of force is being applied to the espresso that is being tamped.

Figure 4:
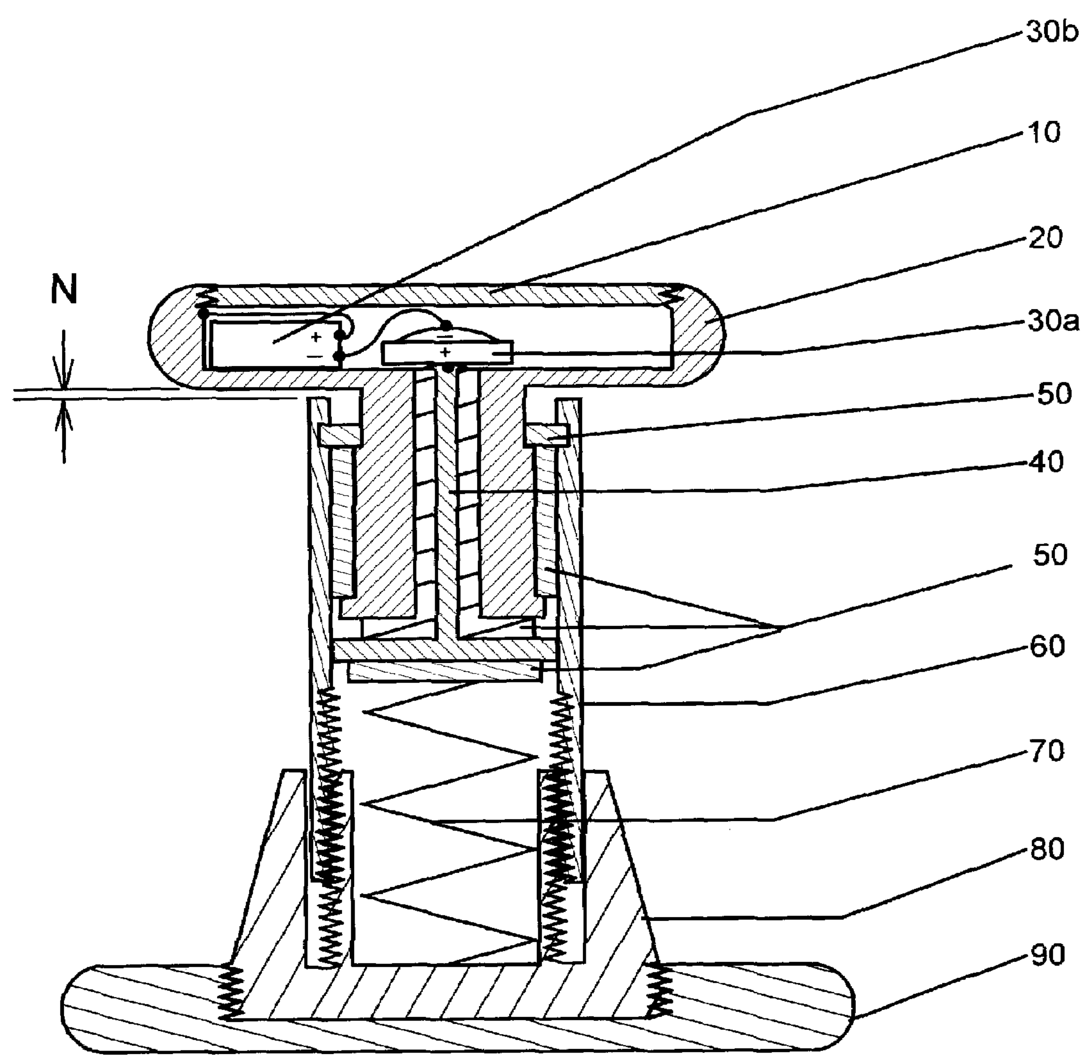
FIG. 4 is a sectional view, large scale along line 4—4 of FIG. 2.

FIG. 4 shows a sectional view of our assembled tamper. It is important to note that both the upper assembly or handle 20 and the adjusting barrel 60 are made of electrically conductive material. The upper assembly 20 has a hollow cavity containing an electric battery 30*a* and an electric feedback device 30*b*. Electric current from one of two electric terminals on the electric battery 30*a* is conducted to the adjusting barrel 60 by a conductive core and brush 40. When the upper assembly 20 is compressed downward into the adjusting barrel 60 during the tamping process, the upper assembly 20 and the adjusting barrel 60 make electrical contact with each other. At the time of this contact, the electric current passes through the upper assembly 20 to one of the two electrical terminals of the electric feedback device 30*b*. The other terminal of the electric feedback device 30*b* is electrically connected directly to the second of two terminals of the electric battery 30*a*. Compressing the upper assembly 20 into the adjusting barrel 60 closes the electrical circuit and activates the electric feedback device 30*b*. The activated electric feedback device 30*b* notifies the operator of the tamper that the preset amount of force is being applied to the espresso that is being tamped.

FIG. 4 also shows a resistance spring 70. The resistance spring 70 is captured within the adjusting barrel 60. At its lower end, the resistance spring 70 is captured by the adjusting flange 80. The resistance spring 70 is progressively compressed as the adjusting flange 80 is screwed onto the adjusting barrel 60. As the adjusting flange 80 is screwed farther onto the adjusting barrel 60, increasing resistance to further compression is offered by the resistance spring 70.

At its upper end, the resistance spring 70 is captured by the upper assembly 20. The upper assembly 20 moves up and down within the upper barrel 60. Except for minor friction, its movement down into the upper barrel 60 is resisted only by the resistance spring 70. By adjusting the amount of resistance to further compression of the resistance spring 70, one effectively adjusts the amount of downward force necessary to move the upper assembly 20 fully down into the adjusting barrel 60.

Therefore, adjusting how far the adjusting flange 80 is screwed onto the adjusting barrel 60 adjusts the amount of downward force necessary to activate the electric feedback circuit.

Figure 5:
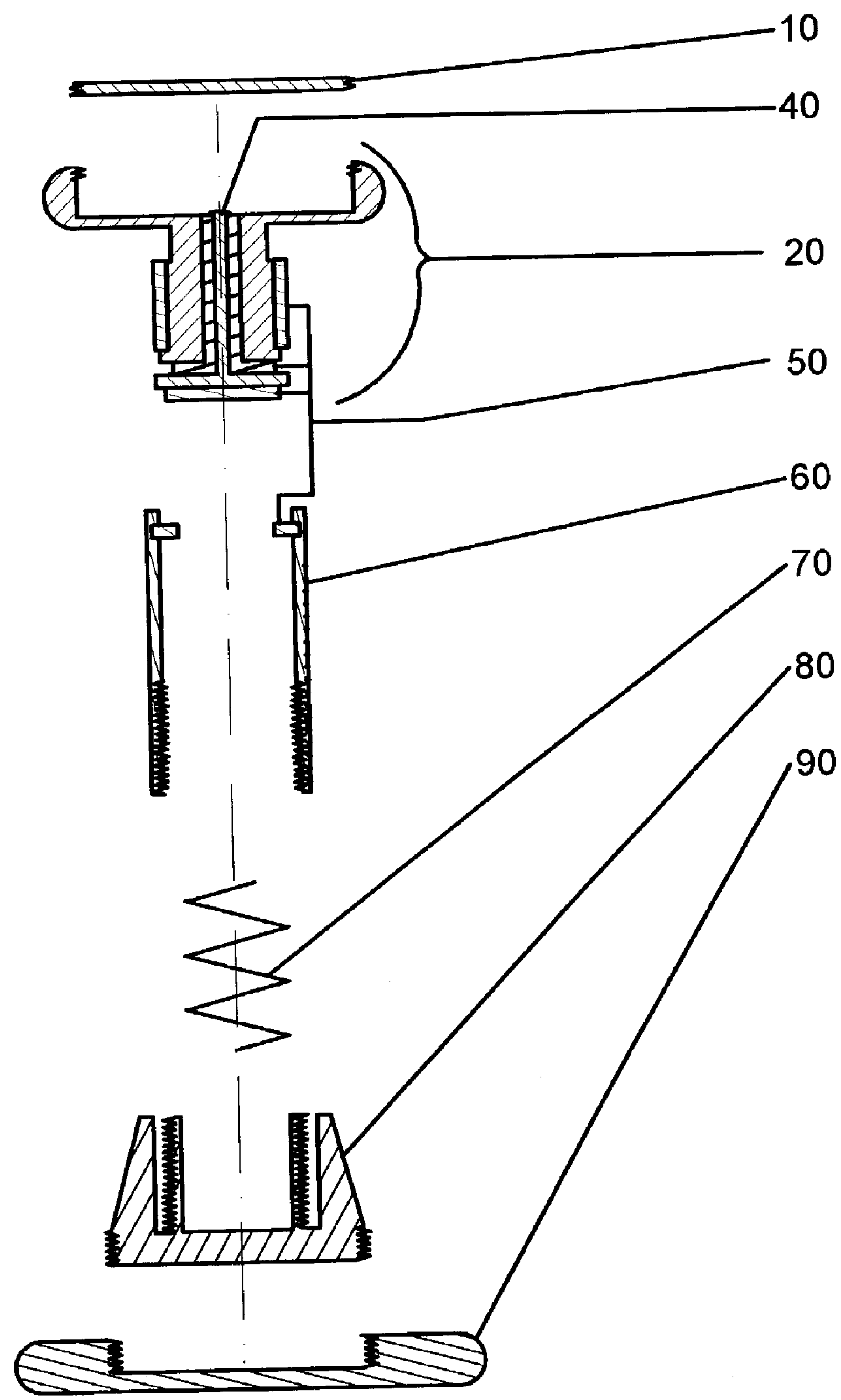
FIG. 5 is an exploded view.

FIG. 5 shows an exploded sectional drawing of the tamper. The electrical battery 30*a* and the electrical feedback device 30*b* are omitted for clarity.

Components not yet introduced that can be seen in FIG. 5 are discussed here. A top cap 10 screws into and closes off the hollow cavity in the upper assembly 20. Some non-electrically-conductive bushings 50 protect and define the electrical feedback circuit. These, non-conductive bushings 50 keep the upper assembly 20 from making electrical contact with adjusting barrel 60 unless the resistance spring 70 is compressed by downward movement of the upper assembly 20 into the adjusting barrel 60.

FIG. 5 also shows that the tamper face 90 is fully screwed onto threads that are located on the lower end of the adjusting flange 80. Attaching the tamper face 90 onto the adjusting flange 80 with threads allows the tamper face 90 to be interchanged with other tamper faces of various size, shapes and materials.

Figure 6:
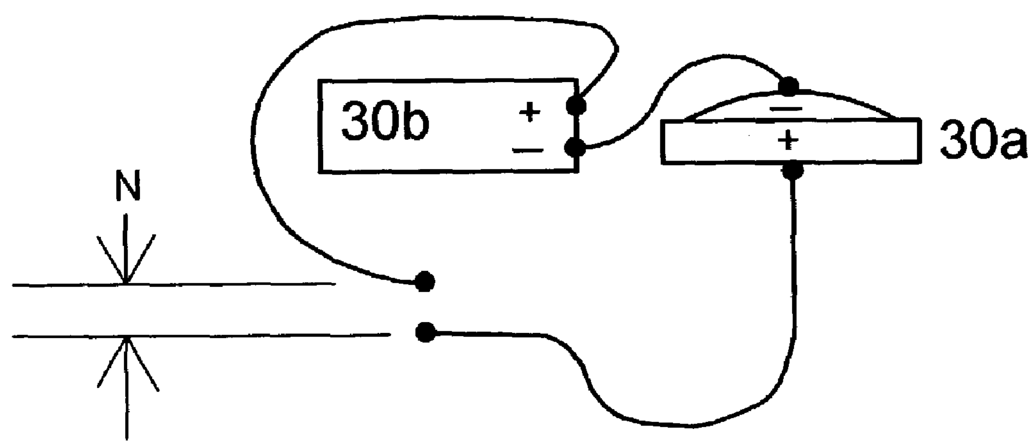
FIG. 6 is an electrical schematic, non-activated position.
Figure 7:
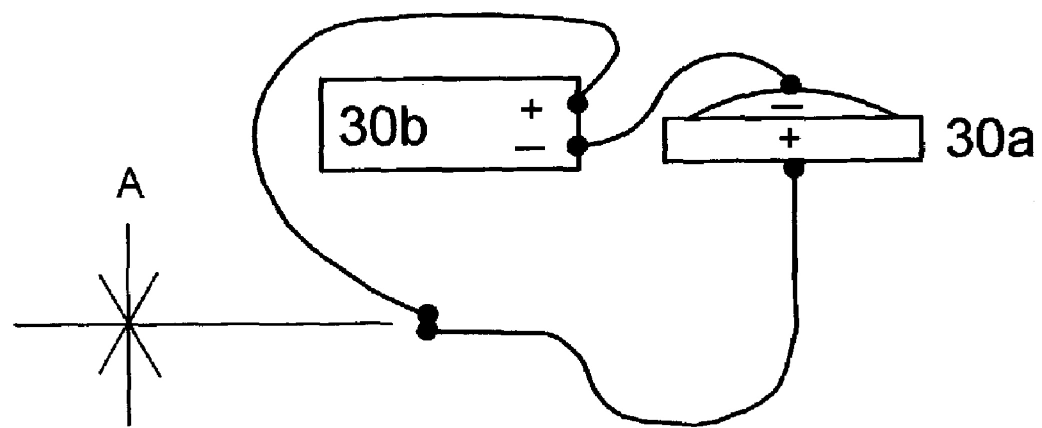
FIG. 7 is an electrical schematic, activated position.

FIG. 6 and FIG. 7 each show the electrical circuit of the tamper.

FIG. 6 shows the electrical circuit when the upper assembly 20 is not in electrical contact with the adjusting barrel 60. The circuit is open, and the electric feedback device 30*b* is not activated.

FIG. 7 shows the electrical circuit when the upper assembly 20 is in electrical contact with the adjusting barrel 60. The circuit is closed, and the electric feedback device 30*b* is activated. The operator of the tamper is notified that the pre-set amount of downward force is being applied to the espresso that is being tamped. The force-adjustable tamper can be used in the espresso coffee making process to overcome many typical problems. Largely, the tamper has the advantages in that:

It permits espresso grounds to be tamped with a uniform and pre-determined amount of force.

It permits the resulting end product of espresso liquid to be replicable and consistent from one cup to the next.

It provides user with greatest flexibility for fine-tuning tamping process.

It allows a user to interchange tamping faces as desired without replacing the entire tamping unit.

Although the description above contains many specifications, these should not be construed as limiting the scope of the invention but as merely providing an illustration of the presently preferred embodiment of this invention. For example, the tamper face can have other shapes, such as concave, convex, or flat. The invention can also be manufactured out of a variety of materials not limited to metal, wood, or plastic.

A noteworthy ramification of this invention is a force-adjustable tamper using solid-state transducer technology in the place of the electromechanical system described above.

Thus the scope of the invention should be determined by the appended claims and their legal equivalents, rather than by the examples given.

What is claimed is:

1. A device for assuring a consistent density for espresso grounds, comprising:

a main housing member including a threaded interior lower surface;

a tamping unit threadingly secured to the lower surface of the main housing unit, said tamping unit including a tamping face oriented away from the housing member;

an upper assembly telescopically received in the upper portion of the main housing unit, said upper assembly including a lower contact surface and an upper handle;

a compression spring mounted between the tamping unit and lower contact surface of the upper assembly; and means for assuring a consistent tamping pressure, wherein said means include an electric feedback circuit to indicate that a predetermined pressure has been reached.

2. A device as in claim 1, wherein the tamping face is interchangeable.

3. A device for applying a predetermined amount of tamping force to espresso grounds comprising:

a tamping face which makes contact with the espresso grounds to be tamped;

a handle adjustably and threadably connected to the tamping face and used to apply force to the tamping face;

a means to predetermine the tamping force and means to indicate that the predetermined tamping force has been applied to the espresso grounds being tamped; and whereby the device assures that the predetermined tamping force is consistently applied to the espresso grounds.

4. A device as in claim 3, wherein the tamping face is interchangeable.

5. A device as in claim 3, wherein the means to predetermine the tamping force comprises a set of indexing marks on the handle and the predetermined tamping force is adjustable by the operator of the device.

6. A device as in claim 3, wherein the means to indicate that the predetermined tamping force is consistently applied includes an electric feedback circuit.

* * * * *